United States Patent
Sorensen et al.

[15] 3,695,807
[45] Oct. 3, 1972

[54] MOLDING A PLASTIC PRINTING PLAQUE

[72] Inventors: Robert L. Sorensen, Westport, Conn.; John Casanova, Racine, Wis.

[73] Assignee: Time, Incorporated, New York, N.Y.

[22] Filed: Aug. 17, 1970

[21] Appl. No.: 64,244

[52] U.S. Cl. ............... 425/407, 264/313, 264/325, 425/410, 249/82
[51] Int. Cl. .................................................. B29c 3/00
[58] Field of Search .......... 18/16 R, 16 E, 16 P, 16.5, 18/16.7, 17 H, DIG. 44, 5 P, 5 H, 5.3 H, 5.3 P, 12 F, 47 R; 249/82; 164/80; 264/325, 313; 425/406, 410, 407

[56] References Cited

UNITED STATES PATENTS

| | | | |
|---|---|---|---|
| 867,692 | 10/1907 | Antisell | 249/82 |
| 2,890,486 | 6/1959 | Crandon | 249/82 X |
| 3,122,787 | 3/1964 | Adams | 18/16 R X |
| 3,278,654 | 10/1966 | Grandperret | 249/82 X |
| 3,389,198 | 6/1968 | Tabe | 249/82 X |

*Primary Examiner*—Robert L. Spicer, Jr.
*Attorney*—Brumbaugh, Graves, Donohue & Raymond

[57] ABSTRACT

A flat, generally rectangular plastic printing plaque is made in a mold formed with a shallow, generally rectangular cavity for receiving and molding a plastic substance. The mold has a flexible portion and is movable between open and closed positions. A press encloses the mold and holds it closed under pressure to facilitate molding of the plastic substance. The relative conformation of the mold and press is such as to leave an insulating space between the flexible portion and the press. The mold is overcharged so that there is a total lateral deformation of the flexible portion which is within the range of 0.002 inches to 0.020 inches and preferably within the range of 0.006 inches to 0.010 inches.

7 Claims, 13 Drawing Figures

PATENTED OCT 3 1972 3,695,807

INVENTORS.
ROBERT L. SORENSEN &
JOHN V. CASANOVA
BY
Brumbaugh, Graves, Donohue & Raymond
their ATTORNEYS INVENTORS.
ROBERT L. SORENSEN &
JOHN V. CASANOVA
BY
their ATTORNEYS.

INVENTORS.
ROBERT L. SORENSEN &
JOHN V. CASANOVA
BY
their ATTORNEYS

MOLDING A PLASTIC PRINTING PLAQUE

BACKGROUND OF THE INVENTION

This invention relates to molding and, more particularly to a novel and highly-effective method and apparatus facilitating the molding of a flat, generally rectangular plastic printing plaque.

Great advances in the molding of plastic printing plaques have been made in recent years. A patent to Sorensen et al. U.S. Pat. No. 3,505,141, for example, discloses a molding of plaques of superior quality by overcharging a mold with a mold substance such as polyamide powder and maintaining the mold substance therein under continuous pressure during the cooling thereof, so that the growth of shrink lines, bubbles and other imperfections, is inhibited during the cooling process.

SUMMARY OF THE INVENTION

An object of the invention is to provide a further advance in the molding of plastic printing plaques and, more particularly, to provide with even greater reliability for the molding of printing plaques that are free of shrink marks, bubbles and other imperfections.

The foregoing and other objects are attained in accordance with the invention by the provision of molding apparatus for making a flat, generally rectangular plastic printing plaque. The molding apparatus comprises mold means formed with a shallow, generally rectangular cavity for receiving and molding a plastic substance. The mold means has a flexible portion and is movable between open and closed positions. Press means is provided for enclosing the mold means, holding the mold means in the closed position under pressure, and facilitating molding of the plastic substance in the mold cavity to form a printing plaque. The relative conformation of the mold means and the press means is such as to leave an insulating space between the flexible portion and the press means. The mold is overcharged so that there is a lateral deformation of the flexible portion which is within the range of 0.002 inches to 0.020 inches and preferably within the range of 0.006 inches to 0.010 inches.

BRIEF DESCRIPTION OF THE DRAWINGS

An understanding of additional aspects of the invention can be gained from a consideration of the following detailed description of representative embodiments thereof, in conjunction with the appended figures of the drawing, wherein.

DESCRIPTION OF THE PREFERRED EMBODIMENTS

Figure 1:
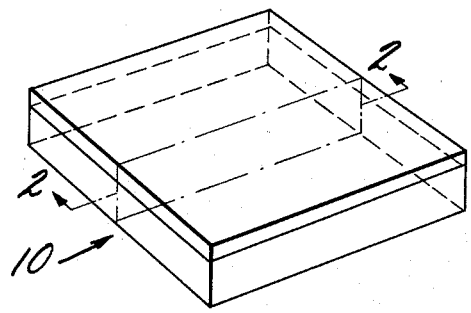
FIG. 1 is a schematic perspective view of a first embodiment of molding apparatus constructed in accordance with the invention.
Figure 2:
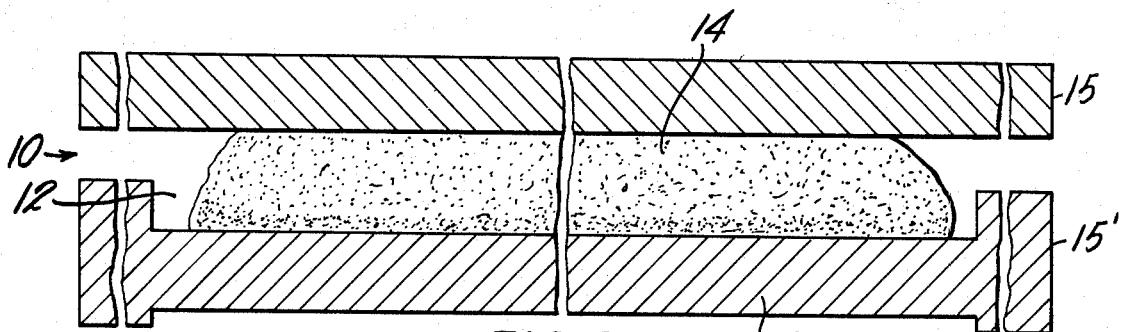
FIG. 2 is a fragmentary sectional view in elevation on a larger scale, taken generally in the plane 2—2 of FIG. 1 and looking in the direction of the arrows and showing the apparatus at a first stage of the production cycle.

Molding apparatus according to the invention is adapted to make a flat, generally rectangular plastic printing plaque. The apparatus comprises mold means 10 shown schematically and in perspective in FIG. 1 and in sectional elevation in FIGS. 2—8. The mold means 10 is formed with a shallow, generally rectangular cavity 12 (FIG. 2). In all of the embodiments, the mold means 10 is movable between open and closed positions, the open position being illustrated in FIG. 2 and the closed position being illustrated in FIGS. 1 and 3–8.

The mold means 10 in the open position is charged with a weighed amount of plastic granules commonly referred to as molding powder 14 (FIG. 2). The granules are discrete pellets or particles of material and the pile contains voids filled with air. The powder volume exceeds the normal volume of the cavity 12 to be formed by the mold top 15 and base 15'.

Figure 3:
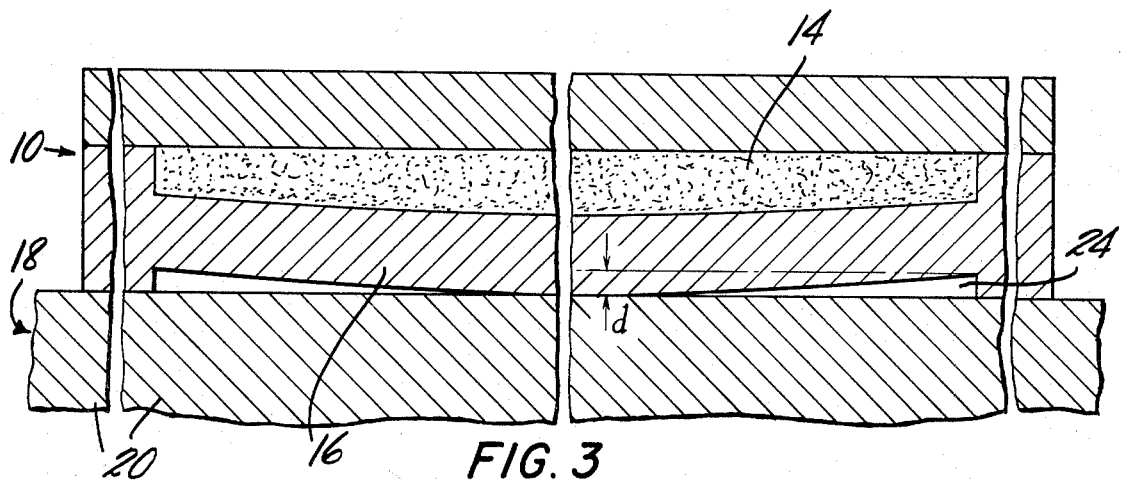
FIG. 3 is a fragmentary sectional view similar to FIG. 2 showing the mold apparatus at a later stage of the production cycle in a first method according to the invention.
Figure 4:
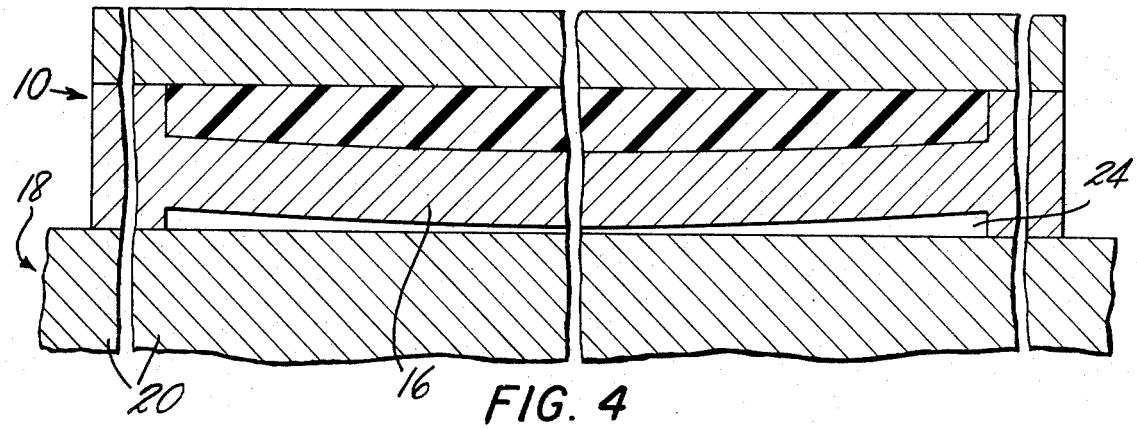
FIG. 4 is a fragmentary sectional view similar to FIG. 3 showing the apparatus at a still later stage of the production cycle.
Figure 5:
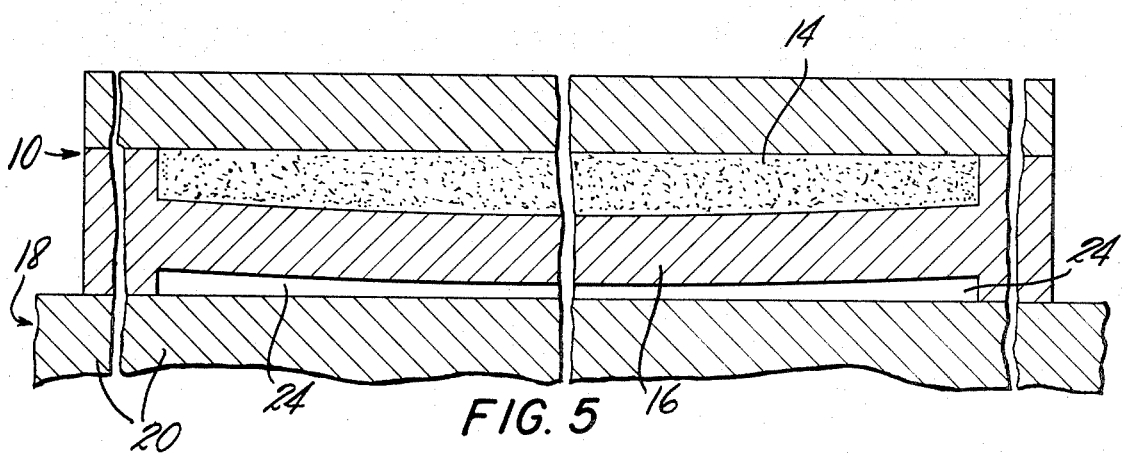
FIG. 5 is a fragmentary sectional view similar to FIG. 3 showing the operation of the apparatus in a second method in accordance with the invention.
Figure 6:
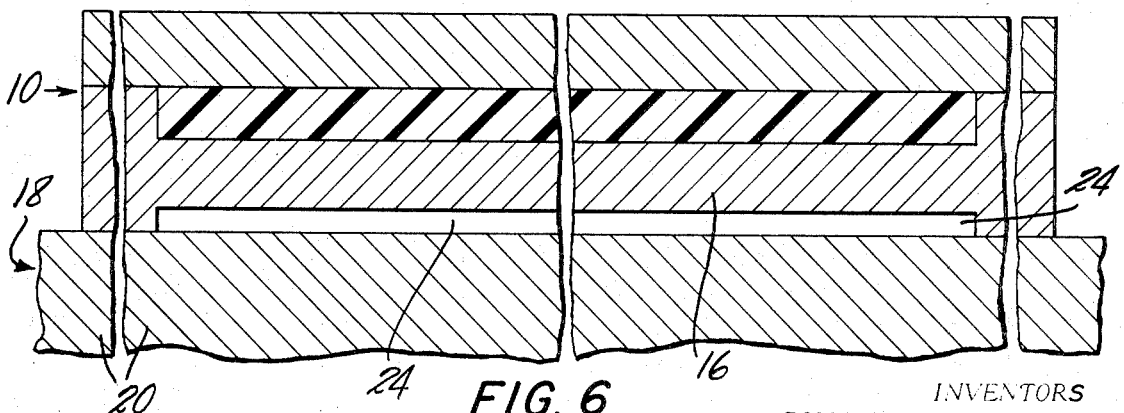
FIG. 6 is a fragmentary sectional view similar to FIG. 4 but showing a stage in the production cycle of which an earlier stage is illustrated in FIG. 5.
Figure 7:
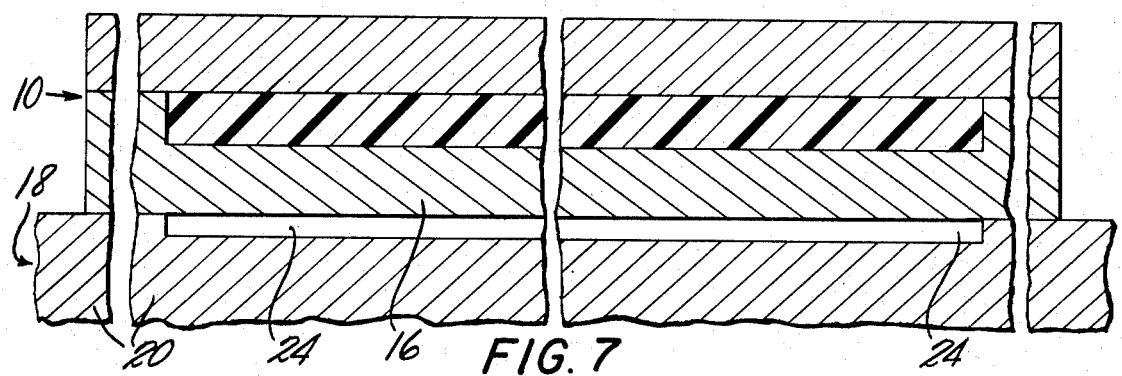
FIGS. 7 and 8 are fragmentary sectional views similar to FIGS. 4 and 6 showing other embodiments of apparatus in accordance with the invention.

When the mold is shut and heated to melt the plastic 14, the molten plastic fills the cavity 12, and in its melt condition the volume is sufficient to bend downward the flexible wall 16 (FIG. 3). The maximum deformation may or may not be limited by abutment of the flexible wall 16 and the platen 20. In any case, the mold means 10 is overcharged sufficiently that the total lateral deformation $d$ of the flexible portion 16 is within the range of 0.002 inches to 0.020 inches and preferably within the range of 0.006 inches to 0.010 inches.

As the plastic cools to a solid state (FIG. 4), its volume decreases because of three factors:

a. changing from the liquid state to the solid state;
b. development of orientation or crystallinity within the solid structure; and
c. contraction as the temperature of the mold substance decreases.

In connection with factor (c), the thermal coefficient of expansion and contraction for plastics often exceeds that of metals by a factor of 10 or more. The mold assemblies are made of metal for reasons of permanence and good heat transfer characteristics, so that the change of the mold volume for a given temperature change is less than the change in volume of the plastic for the same temperature change.

If the plastic volume is permitted to become less than the mold volume during solidification and normalizing, random shrink lines form on one or both of the opposite solid plastic surfaces, and the plastic contains gas pockets or bubbles if there is any volatile material in the plastic mass. This results in a plaque of low quality and often in a plaque that is worthless.

To prevent this, the cavity is overcharged as indicated above, and the flexible wall 16 attempts to restore itself to an undeformed condition during cooling; this keeps the plastic mass under pressure during cooling and at the same time accommodates the volume changes.

Figure 8:
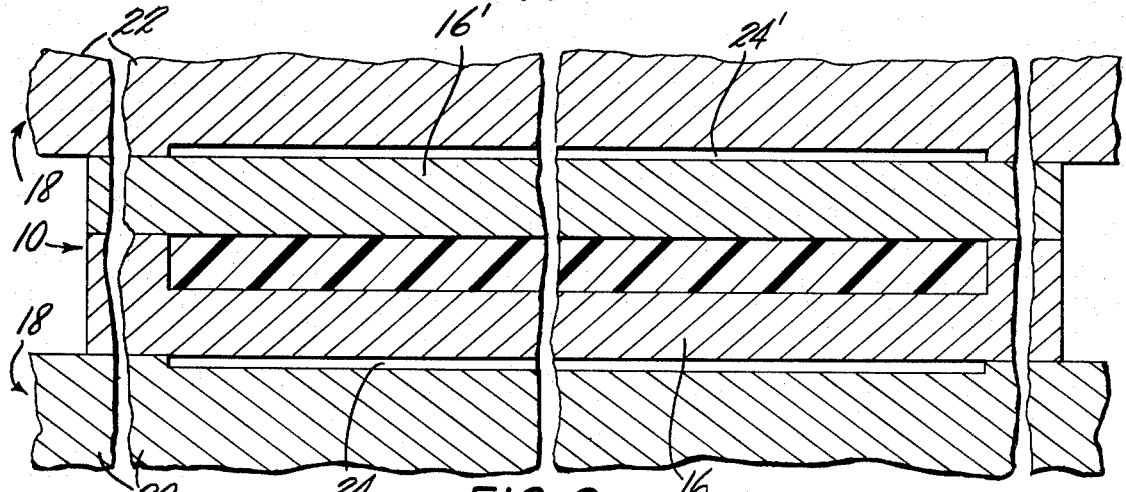

The mold means flexible portion may comprise a single flexible wall 16 or, as in the embodiment of FIG. 8, two flexible walls 16 and 16'.

Press means 18 is provided and includes a lower press platen 20 and an upper press platen 22, the latter being illustrated in FIG. 8. The press means 18 encloses the mold means 10, holds the mold means in the closed position under pressure, and facilitates molding of the plastic substance 14 in the mold cavity 12 to form a printing plaque.

In accordance with the invention, the relative conformation of the mold means 10 and the press means 18 is such as to leave an insulating space between the flexible wall 16 (FIGS. 2–7) or the flexible walls 16 and 16' (FIG. 8) of the mold means 10 and the press means 18. The insulating space may comprise a single compartment 24, as illustrated in FIGS. 3–7, or two compartments 24 and 24', as illustrated in FIG. 8.

In the embodiments of FIGS. 2–7, the flexible wall 16 can deform laterally into the compartment 24; in the embodiment of FIG. 8, the flexible walls 16 and 16' can deform laterally into the compartments 24 and 24', respectively. Such deformation takes place, as indicated above, because the cavity 12 is intentionally overcharged, and closing of the mold means produces a bulge at the center of the flexible wall or walls to accommodate the excess charge. Upon contraction of the plastic as it cools, the final product is somewhat thicker at the center than at the edges (FIG. 4) or is of uniform thickness throughout (FIGS. 6–8), depending on the initial charge.

An important feature of the present invention is that, whether the insulating space is represented by a single compartment adjacent to one flexible wall of the mold or two compartments respectively adjacent to opposite flexible walls of the mold, the total lateral deformation of the flexible portion into the insulating space is within the range of 0.002 inches to 0.020 inches and preferably within the range of 0.006 inches to 0.010 inches. By a lateral deformation is meant a displacement of the flexible wall, or a part of it, in a direction perpendicular to the plane in which the flexible wall normally lies. By a total deformation is meant the displacement of the one flexible wall, if there is only one, or the sum of the displacements of the two flexible walls, if there are two.

The relationship set forth above is valid regardless, within wide limits, of the major dimensions of the rectangular plaque. A typical such plaque may measure, for example, 9 × 12 inches and be on the order of 0.082 inch thick.

For a very large or small plaque, however, some deviation from the relationship set forth above may be tolerated. In particular, good results are obtained so long as the total lateral deformation of the flexible wall or walls into the insulating space or spaces is at maximum substantially equal to 1/5 of 1 percent and preferably 1/10 of 1 percent of one of the major dimensions of the plaque or so long as the total lateral deformation of the flexible portion into the insulating space is at maximum substantially equal to 20 percent and preferably 10 percent of the thickness of the plaque.

If the flexible portion of the mold means 10 comprises a single flexible wall, the insulating space comprises a single compartment and the wall can deform laterally into the insulating space within the entire range up to the maximum specified. On the other hand, if the mold means 10 comprises two flexible walls, then the insulating space comprises two compartments 24 and 24' of equal depth, each being equal to half the depth that would otherwise be employed, so that the compartments respectively permit deformation of each of the walls within half of the specified range. That is, each of two flexible walls is capable of a lateral deformation which at maximum is within the range of 0.003 inches to 0.005 inches; or each of two flexible walls is capable of a lateral deformation which at maximum is substantially equal to 1/20 of 1 percent of one of the major dimensions of the plaque; or each of two flexible walls is capable of a lateral deformation which at maximum is equal to 5 percent of the thickness of the plaque.

In practicing the method of the invention, the mold cavity 12 is intentionally overcharged, as indicated above. By changing the weight of the plastic charged into the mold cavity, one can change the final configuration of the solid plastic plaque. For example, to make a plastic plaque measuring 9 × 12 × 0.082 inches, a thick center is produced by charging the cavity 12 with 171 grams of light-sensitive polyamide or polyurethane molding powder containing a volatile material (moisture) substantially equal to 1.5 percent of the weight of the composition. The resulting plaque is 0.003 inch thicker at the center than at the edges. To produce a plaque of uniform thickness, the charge is reduced by 5 grams.

The entire molding operation may be performed employing only a single press means, which is cycled between heating and cooling phases, and this is quite satisfactory for small-scale production, as in a laboratory. However, for high-volume commercial applications, it is more economical to have a hot press and a cold press between which the mold means 10 is transferred. This avoids the necessity of alternately heating and cooling large masses of metal and results in a saving of time and power requirements and hence in a reduction in cost.

Figure 9:
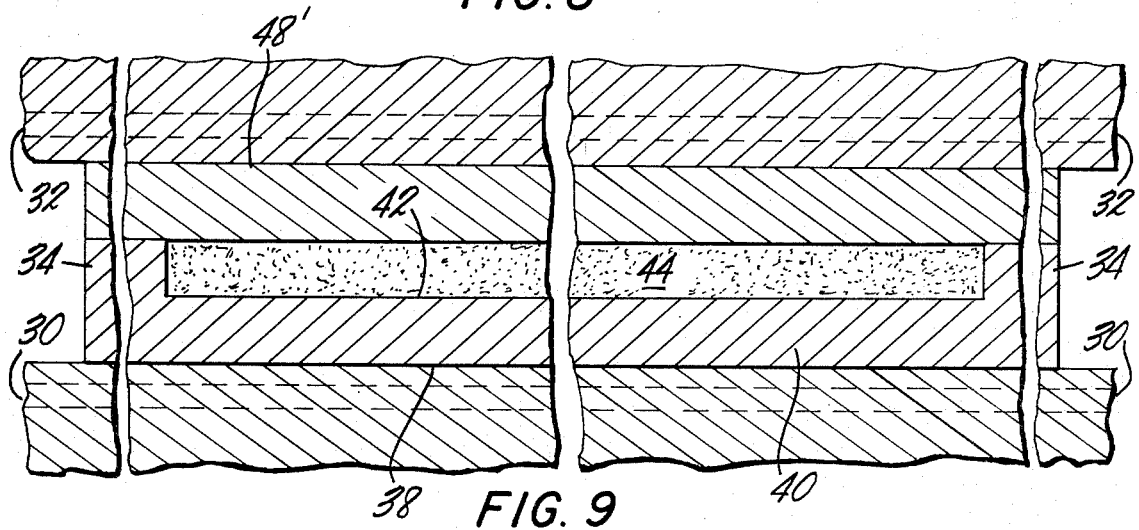
FIGS. 9–12 are fragmentary sectional views in elevation showing defects in the operation of certain conventional molding apparatus which are overcome in accordance with the present invention.
Figure 10:
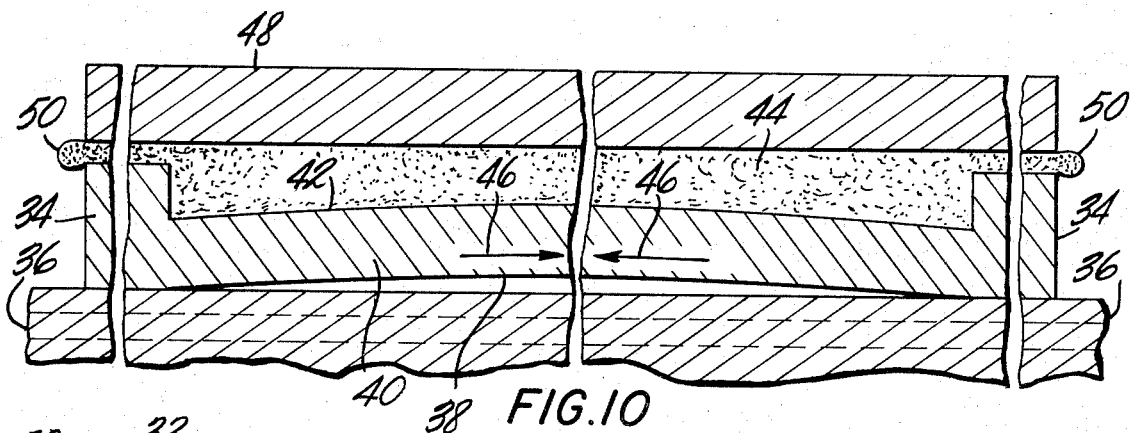

In this embodiment of the invention, the compartments 24 and 24' serve an additional function of preventing an oil-can effect characteristic of conventional molding techniques. The oil-can effect is illustrated in FIGS. 9–12. FIG. 9 shows a lower hot press platen 30 and an upper hot press platen 32 enclosing a mold 34. Following the heating phase, the mold is transferred to a cold press. FIG. 10 shows a lower cold press platen 36 supporting the mold 34. The lower surface 38 of the flexible member 40 of the mold 34 is in contact with the cold lower press platen 36 at the same time as the upper surface 42 thereof is in contact with the hot mold substance 44. This produces a contracting force on the lower surface 38, represented by arrows 46. No such force is developed on the upper surface 42, and the result is a bowing upward of the flexible member 40, as illustrated in FIG. 10. This causes an opening by force of the mold top 48 and the oozing out or flashing of molten plastic as indicated at 50.

Figure 11:
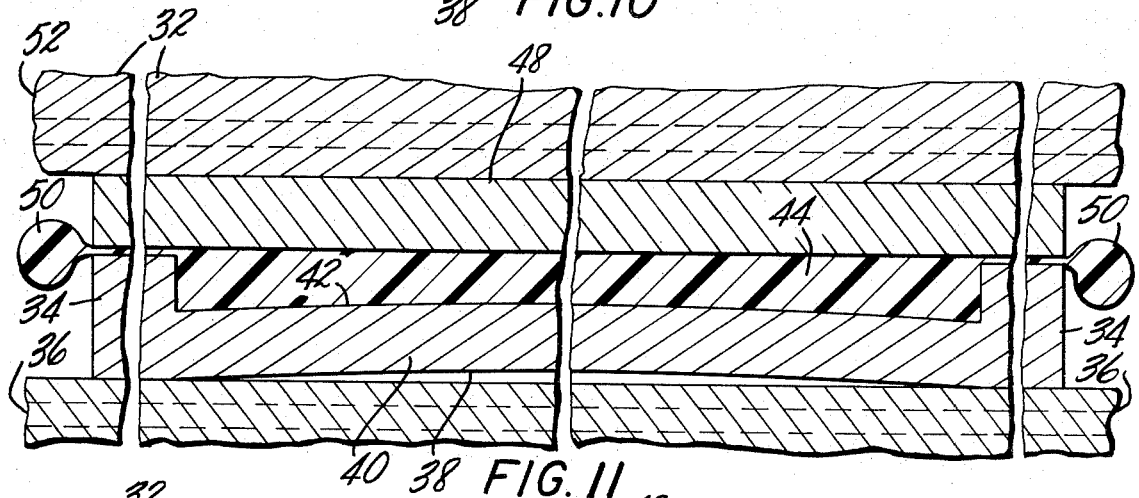
Figure 12:
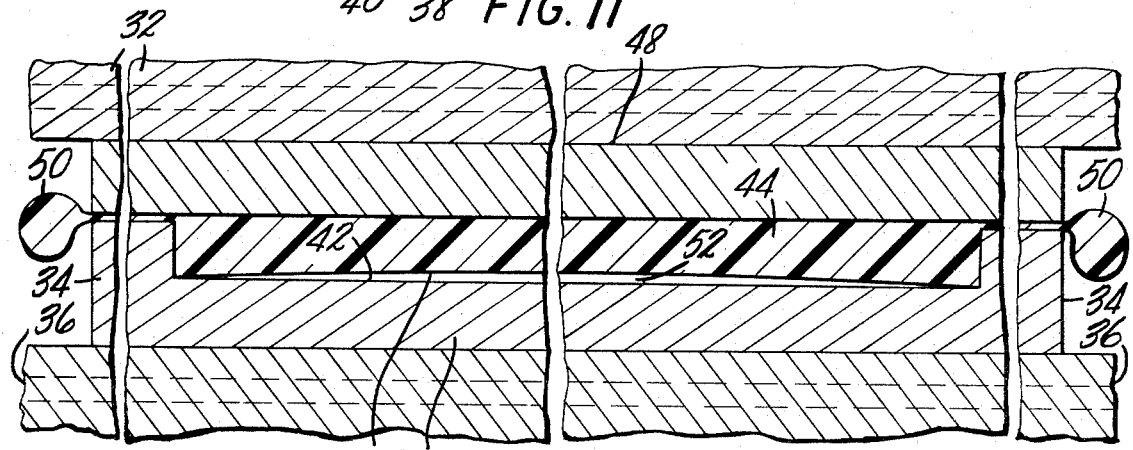

When the cold press upper platen 52 closes with respect to the lower platen 36 under high pressure, much of the flash material 50 is forced out of the mold assembly, as shown in FIG. 11. During the cooling cycle, the mold cavity volume expands as the bow is removed from the flexible member 40 and the upper surface 42 thereof contracts, as shown in FIG. 12, leaving a space 52.

Figure 13:
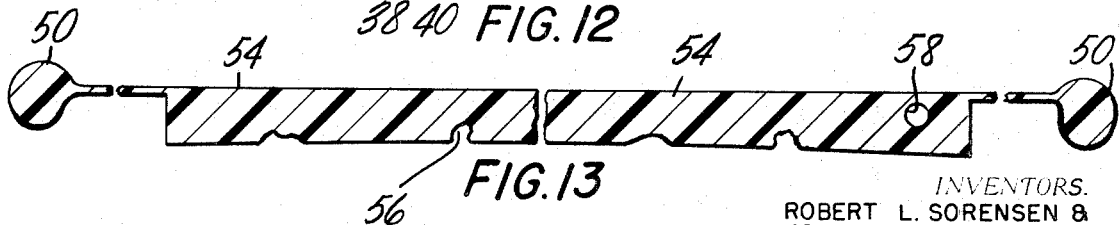
FIG. 13 is a fragmentary section view in elevation showing a defective product produced by the conventional apparatus of FIGS. 9–12.

The resulting conventional molded plaque 54 shown in FIG. 13 is worthless. It has a thin center and poor caliper as well as shrink marks 56 and bubbles 58, since it was cooled without being subjected simultaneously to pressure. The present invention thus prevents plaque imperfections resulting from typical single-press techniques and also the oil-can effect that characterizes typical transfer molding techniques.

Thus there is provided in accordance with the invention novel and highly-effective molding methods and apparatus facilitating the production of a plastic printing plaque that can be either of uniform thickness or somewhat thicker at the center than at the edges and that is formed without shrink marks, bubbles, or other imperfections. The printing plaque can be made of a light-sensitive plastic and need not be bonded to an electrotype shell. The precise control of the maximum lateral distortion of the flexible walls achieved in accordance with the invention permits a degree of quality control not heretofore attainable.

Many modifications of the representative embodiments of the invention disclosed herein will readily occur to those skilled in the art. For example, the insulating spaces provided in accordance with the invention may throughout most of their area be of greater depth than the maximum permissible distortion of the flexible walls, and abutment means may be provided, formed, for example, on the flexible walls or on the press platens, for limiting the maximum lateral distortion of the flexible walls. Accordingly, the invention is to be construed as including all of the embodiments thereof within the scope of the appended claims.

We claim:

1. Molding apparatus for making a flat, generally rectangular plastic printing plaque, comprising mold means formed with a shallow, generally rectangular cavity for receiving and molding a plastic substance, said mold means having a flexible portion and being movable between open and closed positions, and press means for enclosing said mold means, holding said mold means in said closed position under pressure, and facilitating molding of said plastic substance in said mold cavity to form a printing plaque, the relative conformation of said mold means and said press means being such as to leave an insulating space between said flexible portion and said press means, said insulating space permitting a total lateral deformation of said flexible portion thereinto which is within the range of 0.002 inches to 0.020 inches.

2. Molding apparatus according to claim 1 wherein said range is 0.006 inches to 0.010 inches.

3. Molding apparatus according to claim 1 wherein said flexible portion comprises a flexible wall of said mold means and said insulating space permits deformation of said wall within said range.

4. Molding apparatus according to claim 1 wherein said flexible portion comprises two flexible walls of said mold means and said insulating space comprises two compartments, said compartments respectively permitting deformation of each of said walls within half said range.

5. Molding apparatus according to claim 1 wherein said press means comprises a hot press and a cold press for successively enclosing said mold means, the relative conformation of said mold means on the one hand and said hot and cold presses on the other being such as to leave an insulating space between said flexible portion and said hot press when said hot press encloses said mold means and between said flexible portion and said cold press when said cold press encloses said mold means.

6. Molding apparatus for making a flat, generally rectangular plastic printing plaque, comprising mold means formed with a shallow, generally rectangular cavity for receiving and molding a plastic substance, said mold means having a flexible portion and being movable between open and closed positions, and press means for enclosing said mold means, holding said mold means in said closed position under pressure, the facilitating molding of said plastic substance in said mold cavity to form a printing plaque, the relative conformation of said mold means and said press means being such as to leave an insulating space between said flexible portion and said press means, said insulating space permitting a total lateral deformation of said flexible portion thereinto which is substantially equal to 1/10 of 1 percent of one of the major dimensions of said plaque.

7. Molding apparatus for making a flat, generally rectangular plastic printing plaque, comprising mold means formed with a shallow, generally rectangular cavity for receiving and molding a plastic substance, said mold means having a flexible portion and being movable between open and closed positions, and press means for enclosing said mold means, holding said mold means in said closed position under pressure, and facilitating molding of said plastic substance in said mold cavity to form a printing plaque, the relative conformation of said mold means and said press means being such as to leave an insulating space between said flexible portion and said press means, said insulating space permitting a total lateral deformation of said flexible portion thereinto which is substantially equal to 10 percent of the thickness of said plaque.

* * * * *